United States Patent
Enzaki

(10) Patent No.: US 12,129,878 B2
(45) Date of Patent: Oct. 29, 2024

(54) AIR CONTROL CIRCUIT EQUIPPED WITH SAFETY FEATURE

(71) Applicant: SMC CORPORATION, Chiyoda-ku (JP)

(72) Inventor: Akira Enzaki, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 13 days.

(21) Appl. No.: 18/252,911

(22) PCT Filed: Oct. 21, 2021

(86) PCT No.: PCT/JP2021/038850
§ 371 (c)(1),
(2) Date: May 15, 2023

(87) PCT Pub. No.: WO2022/107540
PCT Pub. Date: May 27, 2022

(65) Prior Publication Data
US 2023/0417262 A1    Dec. 28, 2023

(30) Foreign Application Priority Data

Nov. 18, 2020  (WO) .................. PCT/JP2020/042879

(51) Int. Cl.
*F15B 20/00*  (2006.01)
*F15B 11/06*  (2006.01)
*G05D 16/20*  (2006.01)

(52) U.S. Cl.
CPC ............ *F15B 20/008* (2013.01); *F15B 11/06* (2013.01); *G05D 16/2024* (2019.01); *G05D 16/2033* (2013.01)

(58) Field of Classification Search
CPC .................. F15B 20/008; F15B 20/001; F15B 2211/30565; F15B 2211/3138;
(Continued)

(56) References Cited

U.S. PATENT DOCUMENTS 3,630,121 A * 12/1971 Landaeus .............. E02F 9/2203
91/437
3,916,693 A * 11/1975 Hancart ................. G01N 1/125
73/864.31

(Continued)

FOREIGN PATENT DOCUMENTS

GB    2 064 728 A    6/1981
JP    50-674 U    1/1975

(Continued)

OTHER PUBLICATIONS

International Search Report issued Dec. 14, 2021 in PCT/JP2021/038850 filed on Oct. 21, 2021, 2 pages.

*Primary Examiner* — Umashankar Venkatesan
(74) *Attorney, Agent, or Firm* — Oblon, McClelland, Maier & Neustadt, L.L.P.

(57) ABSTRACT

An air control circuit including a safety function is simply formed from an air circuit. An air control circuit includes a main air line that controls an air device by concurrently turning on or off two external-pilot-operated electromagnetic valves, a pilot air line that supplies pilot air to the electromagnetic valves, and a pilot control line that switches the pilot air line between a supply state and an exhaust state. When one of the two electromagnetic valves suffers a breakdown to fail to be switched to an off position, air in the air device is exhausted through the other electromagnetic valve that has been switched to the off position to recover the air device, and the pilot air line is switched to the exhaust state by the pilot control line to prevent the two electromagnetic valves from restarting.

7 Claims, 9 Drawing Sheets

(58) Field of Classification Search
CPC ........ F15B 2211/329; F15B 2211/6355; F15B 2211/67; F15B 2211/7052; F15B 2211/8757; F15B 2211/8855; F15B 20/00
See application file for complete search history.

(56) References Cited

U.S. PATENT DOCUMENTS

| | | | | | |
|---|---|---|---|---|---|
| 3,948,146 | A | * | 4/1976 | Maurer | F15B 11/02 91/464 |
| 4,152,921 | A | * | 5/1979 | Dits | F15B 11/0725 72/453.02 |
| 5,355,773 | A | * | 10/1994 | Winkels | F15B 11/02 91/452 |
| 6,003,428 | A | * | 12/1999 | Mundie | F15B 11/10 91/465 |
| 6,279,370 | B1 | * | 8/2001 | Awad | B21D 43/20 72/472 |
| 11,268,542 | B2 | * | 3/2022 | Medina | B64C 13/504 |
| 11,415,154 | B2 | * | 8/2022 | Greenwood | F15B 11/10 |
| 11,674,531 | B2 | * | 6/2023 | Heitmann | F15B 11/024 417/267 |
| 2003/0136124 | A1 | * | 7/2003 | Albert | F15B 20/008 60/477 |
| 2004/0168729 | A1 | | 9/2004 | Hodges | |
| 2007/0267072 | A1 | * | 11/2007 | Michaelis | F15B 20/008 137/596 |
| 2014/0060029 | A1 | * | 3/2014 | Meinhof | F15B 20/005 60/409 |
| 2017/0051768 | A1 | * | 2/2017 | Sauer | F15B 20/008 |
| 2017/0159263 | A1 | * | 6/2017 | Meier | E02F 3/369 |
| 2019/0003587 | A1 | * | 1/2019 | Schafer | F15B 1/024 |
| 2020/0240444 | A1 | | 7/2020 | Tadje | |
| 2020/0255125 | A1 | * | 8/2020 | Medina | B64C 13/44 |
| 2020/0325914 | A1 | * | 10/2020 | Greenwood | F15B 11/028 |
| 2021/0040946 | A1 | * | 2/2021 | Heitmann | F15B 11/06 |
| 2022/0252167 | A1 | * | 8/2022 | Usinger | F16K 11/24 |
| 2022/0268298 | A1 | * | 8/2022 | Shinjo | F15B 11/044 |
| 2023/0167914 | A1 | * | 6/2023 | Brenner | F16K 17/0473 137/625 |
| 2023/0339604 | A1 | * | 10/2023 | Susca | B64C 13/504 |

FOREIGN PATENT DOCUMENTS

| | | |
|---|---|---|
| JP | 56-94003 A | 7/1981 |
| JP | 59-34162 U | 3/1984 |
| JP | 2015-42136 A | 3/2015 |
| WO | WO 2019/072328 A1 | 4/2019 |

* cited by examiner

AIR CONTROL CIRCUIT EQUIPPED WITH SAFETY FEATURE

TECHNICAL FIELD

The present invention relates to an air control circuit equipped with a safety feature for safely controlling an air device such as an air cylinder.

BACKGROUND ART

An air control circuit equipped with a safety feature for safely controlling an air device such as an air cylinder is known as illustrated in, for example, FIG. 11. A known air control circuit includes two 3-port internal-pilot-operated spring-return electromagnetic valves 43 and 44 connected in series in an air line 42 connecting an air source 40 and an air cylinder 41 to each other. The air control circuit can surely exhaust residual air in the air cylinder 41, despite when either the electromagnetic valve 43 or 44 suffers a breakdown and fails to operate normally during the operation of the air cylinder 41, by turning off the other electromagnetic valve 44 or 43.

The above known air control circuit detects that the electromagnetic valve 43 or 44 suffers a breakdown with an electric signal, and has to perform control such as turning off the other electromagnetic valve with a control device such as a sequencer in response to this electric signal. Thus, the air control circuit needs to use an electromagnetic valve equipped with limit switches 46 that detect operation positions of the electromagnetic valves 43 and 44 and outputs electric signals, and concurrently needs the sequencer and a control program for it. The air control circuit thus bears the cost of equipment, and has to ensure a technical expert having thorough knowledge of a safety function and a sequencer program.

SUMMARY OF INVENTION

Technical Problem

A technical problem of the present invention is to form an air control circuit including a safety function for safely controlling an air device simply with an air circuit without using, for example, an electromagnetic valve including a limit switch or a sequencer.

Solution to Problem

To solve the above problem, an air control circuit according to the present invention includes a main air line in which two external-pilot-operated electromagnetic valves are connected in series, a pilot air line that supplies pilot air to the two electromagnetic valves, and a pilot control line that switches the pilot air line between a supply state to supply the pilot air to the two electromagnetic valves and an exhaust state to exhaust the pilot air from the two electromagnetic valves.

The two electromagnetic valves in the main air line are two-position valves that have a first position for when turned off and a second position for when turned on. The two electromagnetic valves are connected so that, when both of the two electromagnetic valves are in the first position, the electromagnetic valves shut an air source and an air device from each other and exhaust air in the air device through one of the electromagnetic valves, when both of the two electromagnetic valves are in the second position, the electromagnetic valves connect the air source and the air device to each other to supply air from the air source to the air device, and when one of the two electromagnetic valves is in the first position and the other one of the two electromagnetic valves is in the second position, the electromagnetic valves shut the air source and the air device from each other and exhaust air in the air device through the electromagnetic valve in the first position.

An air operation valve having a first position where the pilot air line is in the supply state and a second position where the pilot air line is in the exhaust state is connected to the pilot air line.

In addition, the pilot control line is connected to the air source or disconnected from the air source by the two electromagnetic valves. When both of the two electromagnetic valves are in the first position and when both of the two electromagnetic valves are in the second position, the pilot control line is disconnected from the air source to hold the air operation valve in the first position where the pilot air line is in the supply state. When one of the two electromagnetic valves is in the first position and the other one of the two electromagnetic valves is in the second position, the pilot control line is connected to the air source through the two electromagnetic valves to switch the air operation valve to the second position where the pilot air line is in the exhaust state with control air supplied from the air source.

In the present invention, the air operation valve desirably includes a detent mechanism that holds the air operation valve in the second position, and a release button that releases holding of the detent mechanism.

In the air control circuit according to the present invention, a pilot-operated check valve, a manual relief valve, and the air operation valve may be connected to the pilot control line. When pilot air from the pilot air line operates on the pilot-operated check valve, the pilot-operated check valve may allow a forward flow of the control air flowing through the pilot control line from the air source toward the air operation valve and a reverse flow opposite to the forward flow. When the pilot air does not operate on the pilot-operated check valve, the pilot-operated check valve may block the reverse flow of the control air, and the manual relief valve may switch, with a manual operation, the pilot control line from a conduction state to allow the control air to flow to an open state to exhaust the control air to an outside.

In the air control circuit according to the present invention, an air tank may be connected to the pilot control line, and the air tank may store control air supplied from the air source and supply the control air to the air operation valve.

In the air control circuit according to the present invention, the two electromagnetic valves may be 5-port valves, and may include one input port, a first output port, a second output port, a first exhaust port, and a second exhaust port. The two electromagnetic valves may include a first electromagnetic valve connected to the main air line at a portion closer to the air source and a second electromagnetic valve connected to the main air line at a portion closer to the air device. The input port in the first electromagnetic valve may be connected to the air source, the first output port in the first electromagnetic valve may be connected to the input port in the second electromagnetic valve, the second output port in the first electromagnetic valve may be connected to the second exhaust port in the second electromagnetic valve, the first exhaust port and the second exhaust port in the first electromagnetic valve may be open to the outside, the first output port in the second electromagnetic valve may be connected to the air device, the second output port in the second electromagnetic valve may be connected to the pilot control line, and the first exhaust port in the second electromagnetic valve may be open to the outside.

In the air control circuit in the present invention, a delay mechanism that delays a start of the air device may be connected to the main air line.

In this case, the delay mechanism desirably includes a switch valve operated by air, and a throttle valve that restricts the flow rate of air. When both of the two electromagnetic valves are turned on to connect the air source and the air device to each other, air is desirably allowed to flow to the main air line at a restricted rate through the throttle valve. When part of air output from the main air line to the air device is fed back to the switch valve, the switch valve is desirably switched to allow air from the air source to flow through the main air line in a free flowing state.

Advantageous Effects of Invention

According to the present invention, an air control circuit including a safety function is simply formed from an air circuit without using, for example, an electromagnetic valve including a limit switch or a sequencer. This structure is very simple and bears a low cost of equipment, and thus does not need to ensure a technical expert having thorough knowledge of a safety function and a sequencer program.

DESCRIPTION OF EMBODIMENTS

Figure 1:
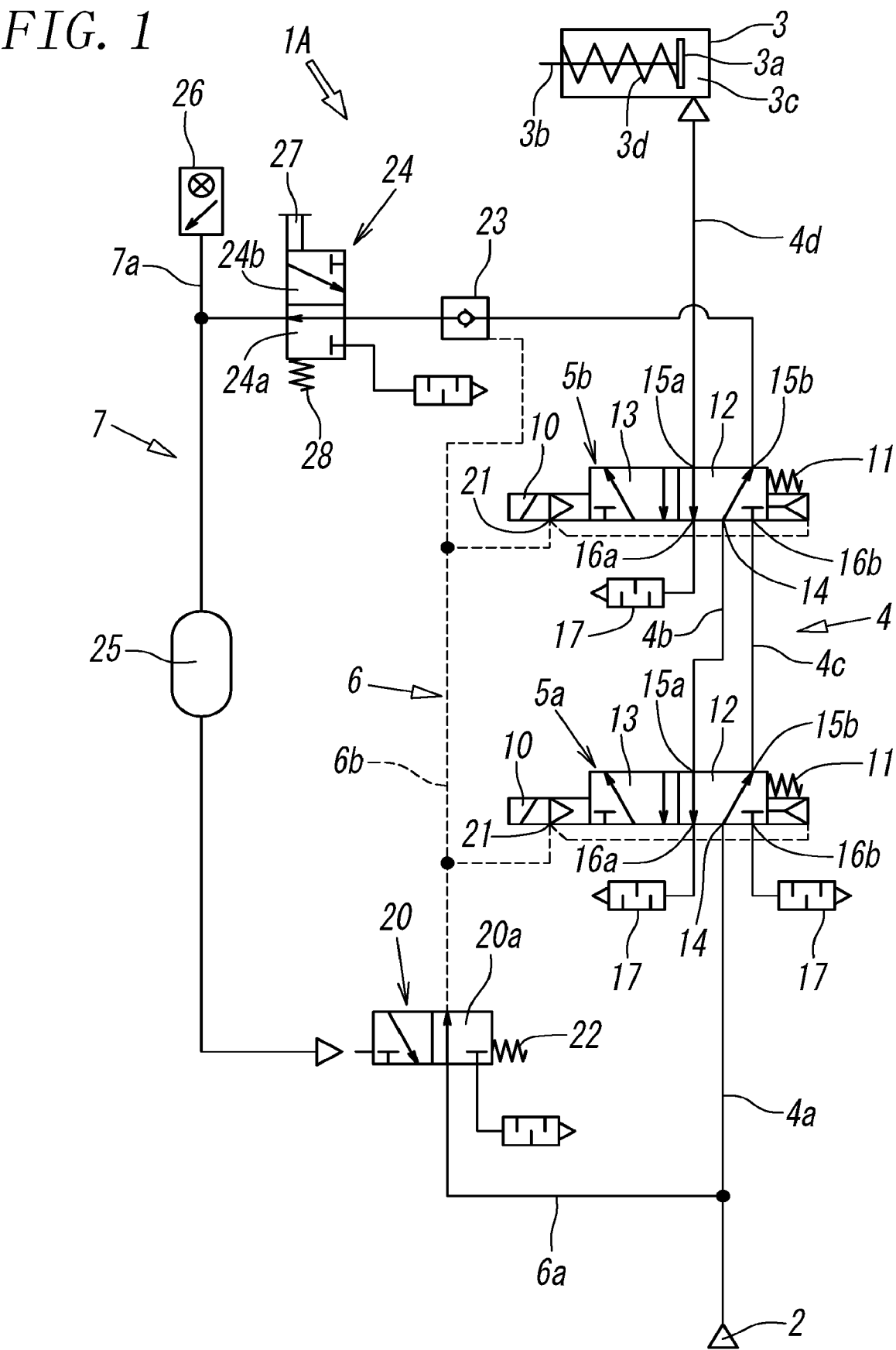
FIG. 1 is a circuit diagram of an air control circuit according to a first embodiment of the present invention.

FIG. 1 to FIG. 5 illustrate an air control circuit including a safety function according to a first embodiment of the present invention. This air control circuit 1A connects an air source 2 and an air device 3 to each other, and controls the air device 3 by supplying air from the air source 2 to the air device 3, and exhausting air in the air device 3 to the outside, and includes a main air line 4 in which two external-pilot-operated electromagnetic valves 5a and 5b are connected in series, a pilot air line 6 that supplies pilot air to the two electromagnetic valves 5a and 5b, and a pilot control line 7 that switches the pilot air line 6 between a supply state to supply pilot air to the two electromagnetic valves 5a and 5b and an exhaust state to exhaust pilot air from the two electromagnetic valves 5a and 5b.

In the present embodiment, the air device 3 is an air cylinder, and the air cylinder 3 is a single-acting air cylinder where a piston 3a and a rod 3b are reciprocated by air supplied into a pressure chamber 3c and a return spring 3d.

The two electromagnetic valves 5a and 5b have the same structure. The electromagnetic valves 5a and 5b are each switched between a first position 12 for when turned off and a second position 13 for when turned on by a return spring 11 and pilot air supplied and exhausted through the on/off operation of a single solenoid 10. Thus, the electromagnetic valves 5a and 5b can be said to be single-solenoid-operated spring-return two-position valves.

The electromagnetic valves 5a and 5b are 5-port valves, and each include a single input port 14, two output ports, that is, a first output port 15a and a second output port 15b, and two exhaust ports, that is, a first exhaust port 16a and a second exhaust port 16b.

Of the two electromagnetic valves 5a and 5b, the electromagnetic valve 5a is a first electromagnetic valve 5a connected to the main air line 4 at a portion closer to the air source 2, and the other electromagnetic valve 5b is a second electromagnetic valve 5b connected to the main air line 4 at a portion closer to the air cylinder 3. The input port 14 in the first electromagnetic valve 5a is connected to the air source 2 through an input line 4a, the first output port 15a in the first electromagnetic valve 5a is connected to the input port 14 in the second electromagnetic valve 5b through a first relay line 4b, the second output port 15b in the first electromagnetic valve 5a is connected to the second exhaust port 16b in the second electromagnetic valve 5b through a second relay line 4c, and the first exhaust port 16a and the second exhaust port 16b in the first electromagnetic valve 5a are open to the outside through silencers 17. The first output port 15a in the second electromagnetic valve 5b is connected to the pressure chamber 3c in the air cylinder 3 through an output line 4d, the second output port 15b in the second electromagnetic valve 5b is connected to a first end of the pilot control line 7, and the first exhaust port 16a in the second electromagnetic valve 5b is open to the outside through a silencer 17.

The two electromagnetic valves 5a and 5b connected to the main air line 4 control the air device by being always concurrently turned on or off by a control device not illustrated, and operate in the following manner.

Firstly, as illustrated in FIG. 1, when the two electromagnetic valves 5a and 5b are both turned off and in the first position 12, the air source 2 and the air cylinder 3 are shut from each other, and air in the pressure chamber 3c in the air cylinder 3 is exhausted to the outside through the electromagnetic valve Specifically, the input line 4a extending from the air source 2 is connected to the second relay line 4c via the first electromagnetic valve 5a, but the second relay line 4c is shut from the second electromagnetic valve 5b. In addition, the output line 4d that connects the air cylinder 3 and the first output port 15a in the second electromagnetic valve 5b is open to the outside through the first exhaust port 16a in the second electromagnetic valve 5b to exhaust air from the air cylinder 3. Thus, the piston 3a and the rod 3b in the air cylinder 3 are retracted to the initial positions by the return spring 3d.

At this time, the pilot control line 7 is open to the outside from the input port 14 and the second output port 15b in the second electromagnetic valve 5b through the first relay line 4b, and the first output port 15a and the first exhaust port 16a in the first electromagnetic valve 5a.

Figure 2:
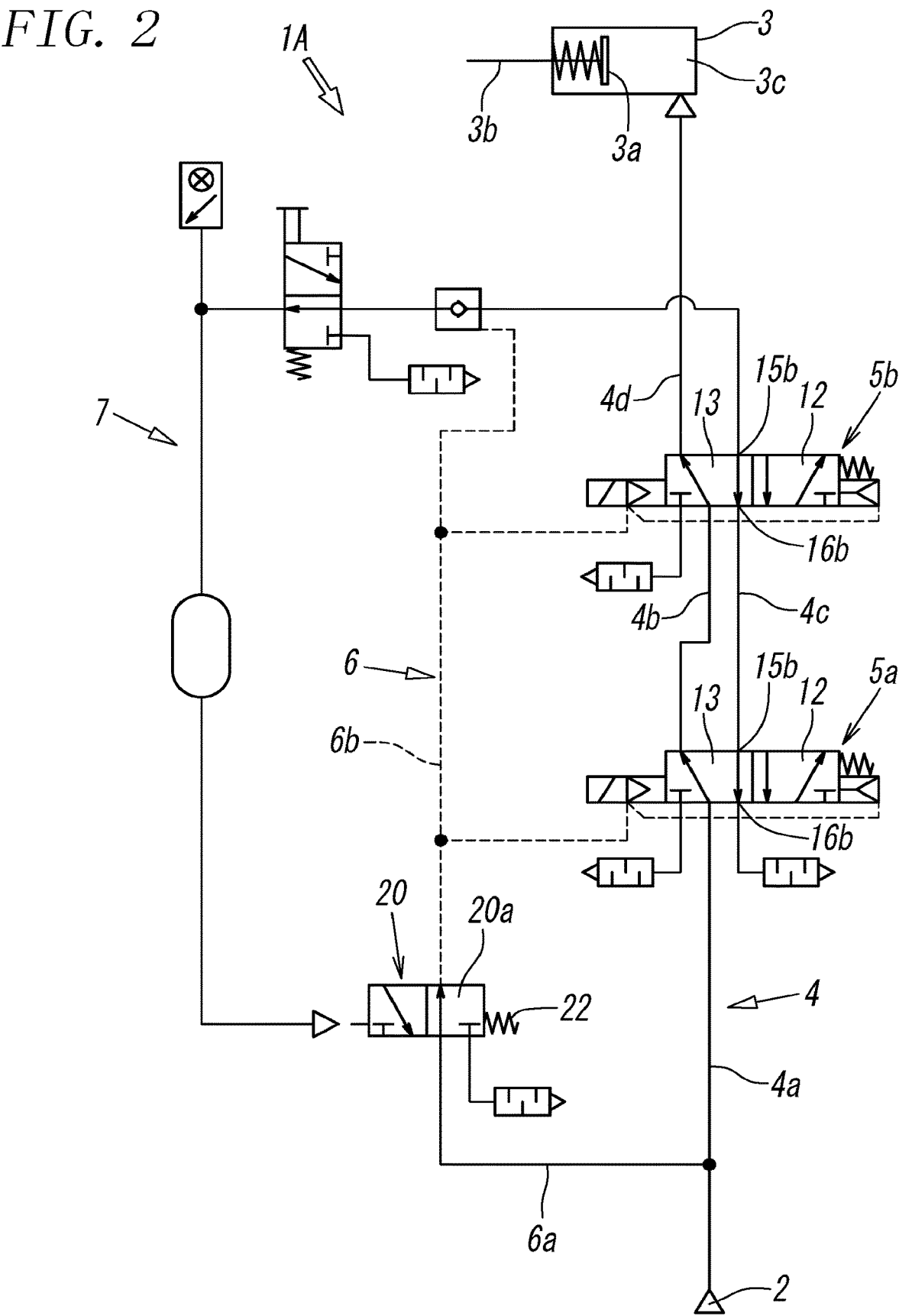
FIG. 2 is a circuit diagram illustrating a different operation state of the air control circuit.

As illustrated in FIG. 2, when the two electromagnetic valves 5a and 5b are both turned on to be switched to the second position 13, the air source 2 and the air cylinder 3 are connected to each other. Specifically, the input line 4a extending from the air source 2, the first relay line 4b, and the output line 4d are sequentially connected to each other through the first electromagnetic valve and the second electromagnetic valve 5b, and air is supplied from the air source 2 to the pressure chamber 3c in the air cylinder 3. Thus, the piston 3a and the rod 3b in the air cylinder 3 move forward toward the operation position.

At this time, the pilot control line 7 is open to the outside from the second output port 15b and the second exhaust port 16b in the second electromagnetic valve 5b through the second relay line 4c, and the second output port 15b and the second exhaust port 16b in the first electromagnetic valve 5a.

Subsequently, when the two electromagnetic valves 5a and 5b are concurrently turned off to return the air control circuit 1A and the air cylinder 3 to the state in FIG. 1, and when one of the electromagnetic valves suffers a breakdown and fails to be switched to the first position 12, as will be described below, the air source 2 and the air device 3 are shut from each other and air in the pressure chamber 3c in the air cylinder 3 is exhausted through the electromagnetic valve 5a or 5b returned to the first position 12.

Figure 3:
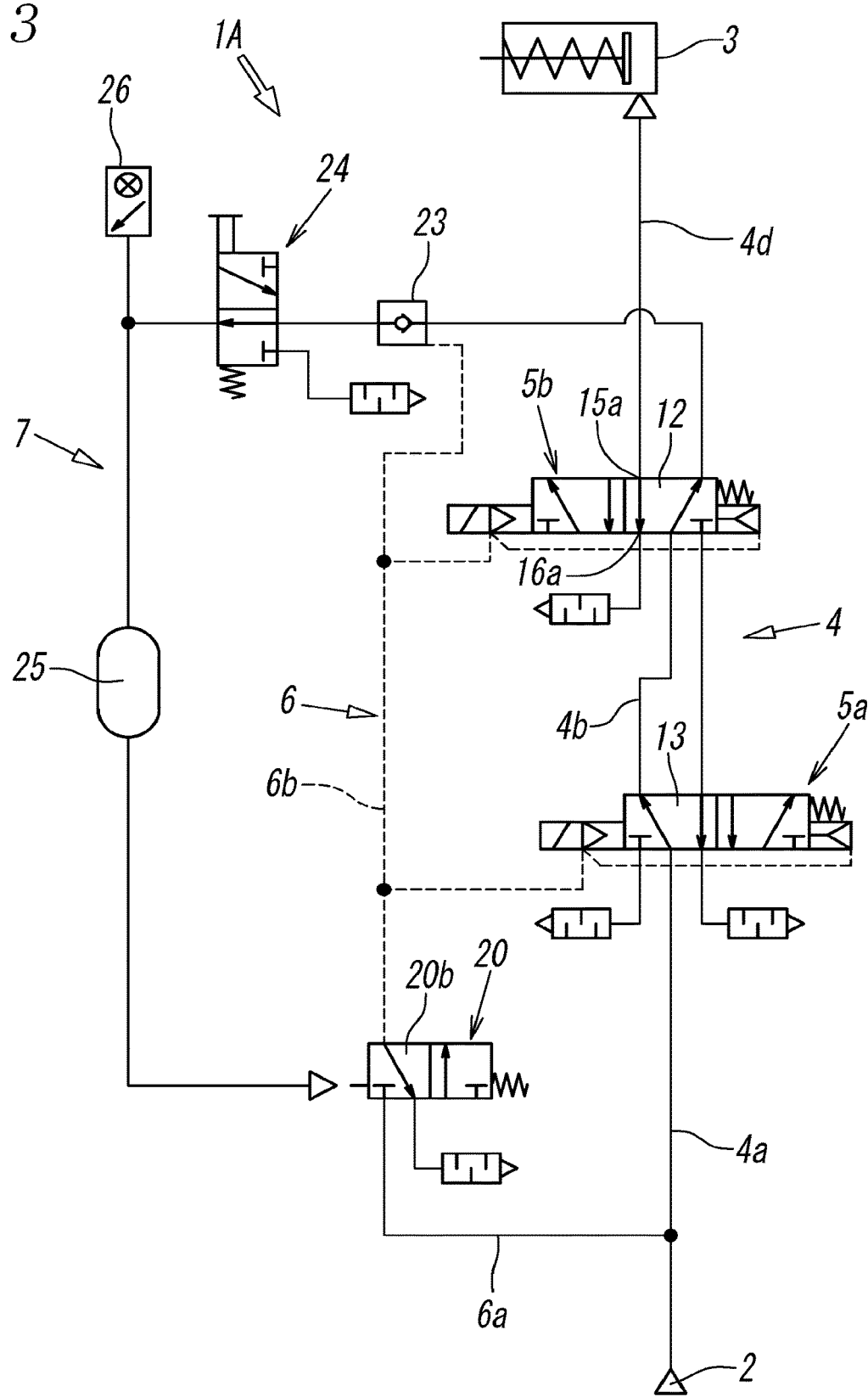
FIG. 3 is a circuit diagram illustrating another different operation state of the air control circuit.

First, as illustrated in FIG. 3, when the first electromagnetic valve 5a suffers a breakdown to be left in the second position 13 and the second electromagnetic valve 5b operates normally to return to the first position 12, the input line 4a extending from the air source 2 is connected to the pilot control line 7 from the first electromagnetic valve 5a through the first relay line 4b and the second electromagnetic valve 5b to supply control air to the pilot control line 7. In contrast, the output line 4d connected to the air cylinder 3 is shut from the air source 2 and is open to the outside through the first output port 15a and the first exhaust port 16a in the second electromagnetic valve 5b. Thus, air in the air cylinder 3 is exhausted through the second electromagnetic valve 5b, and the air cylinder 3 is returned to the initial position.

Figure 4:
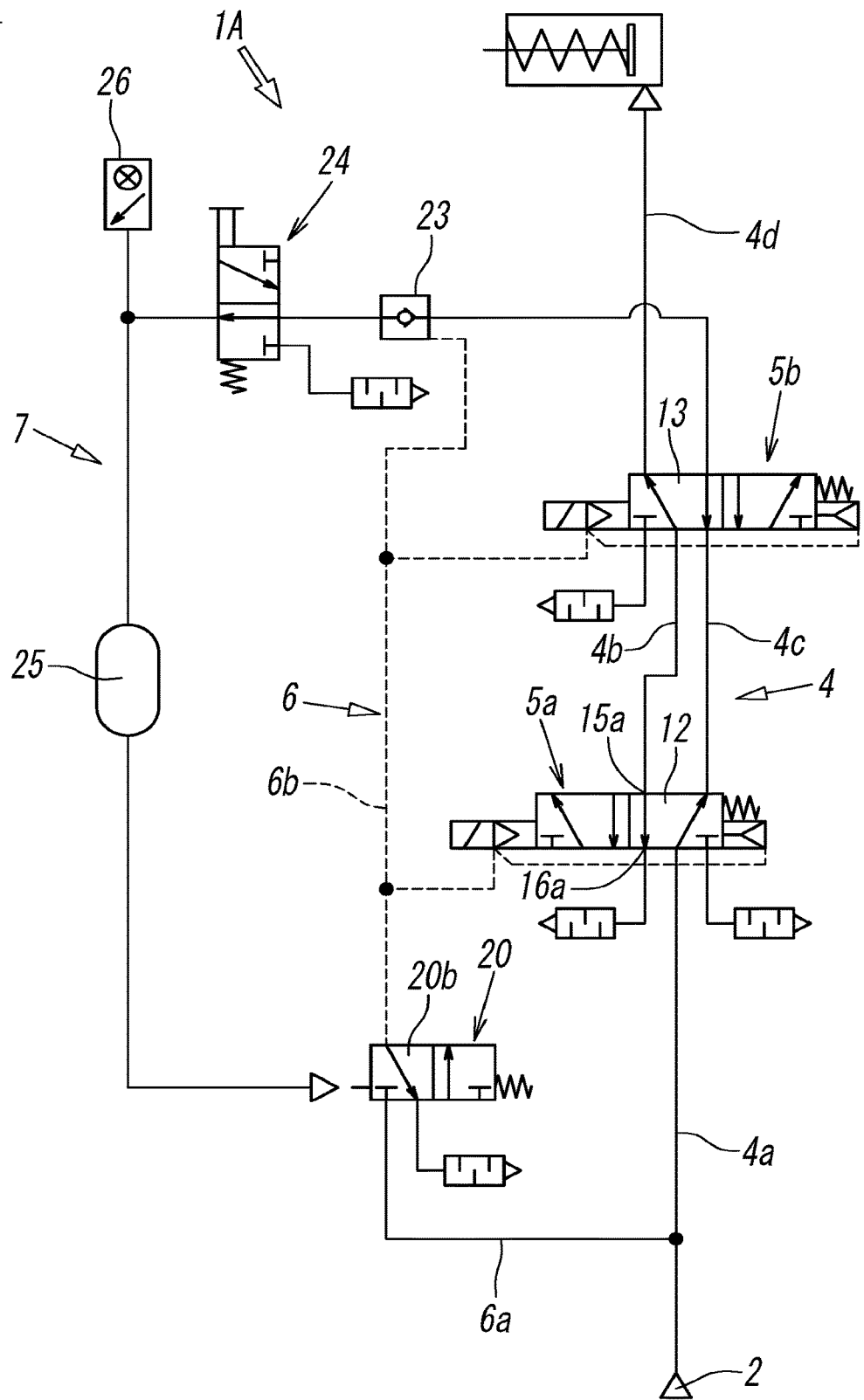
FIG. 4 is a circuit diagram illustrating another different operation state of the air control circuit.

As illustrated in FIG. 4, when the first electromagnetic valve 5a operates normally to return to the first position 12 and the second electromagnetic valve suffers a breakdown to be left in the second position 13, the input line 4a extending from the air source 2 is connected to the pilot control line 7 from the first electromagnetic valve 5a through the second relay line 4c and the second electromagnetic valve 5b, and thus, control air is supplied to the pilot control line 7. In contrast, the output line 4d is shut from the air source 2, and is open to the outside from the second electromagnetic valve 5b through the first relay line 4b, and the first output port 15a and the first exhaust port 16a in the first electromagnetic valve 5a. Thus, air in the air cylinder 3 is exhausted through the first electromagnetic valve 5a, and the air cylinder 3 is returned to the initial position.

Referring back to FIG. 1, the pilot air line 6 diverges from the main air line 4 at a portion between the air source 2 and the first electromagnetic valve 5a, and is connected to pilot ports 21 in the first electromagnetic valve 5a and the second electromagnetic valve 5b through an air operation valve 20 connected to the pilot air line 6.

In the following description, an input side (a side connected to the air source 2) of the air operation valve 20 is referred to as a primary side, and an output side (a side connected to the electromagnetic valves 5a and 5b) of the air operation valve 20 is referred to as a secondary side. Thus, of the pilot air line 6, a portion from the air source 2 to the air operation valve 20 serves as a primary side line 6a, and a portion from the air operation valve 20 to the two electromagnetic valves 5a and 5b serves as a secondary side line 6b.

The air operation valve 20 is a 3-port valve switchable between two positions with operations of a return spring 22 and control air supplied through the pilot control line 7. As illustrated in FIG. 1 and FIG. 2, when the pilot control line 7 is disconnected from the air source 2 and the control air does not operate, the air operation valve 20 is switched by the return spring 22 to a first position 20a to hold the pilot air line 6 in a supply state where the primary side line 6a and the secondary side line 6b are connected to each other. As illustrated in FIG. 3 and FIG. 4, when the pilot control line 7 is connected to the air source 2 and the control air operates, the air operation valve 20 is switched by the control air to a second position 20b to shut the secondary side line 6b and the primary side line 6a in the pilot air line 6 from each other, and the secondary side line 6b becomes open to the outside to be in an exhaust state.

A pilot-operated check valve 23, a manual relief valve 24, and an air tank are sequentially connected in series to the pilot control line 7, from the second electromagnetic valve 5b toward the air operation valve 20, and a pilot lamp 26 that indicates that control air is being supplied to the pilot control line 7 is connected to a display line 7a that diverges from a portion between the manual relief valve 24 and the air tank 25.

When pilot air from the pilot air line 6 operates, the pilot-operated check valve 23 allows the pilot control line 7 to conduct in both directions, and when the pilot air does not operate, the pilot-operated check valve 23 allows the pilot control line 7 to conduct simply in one direction. In other words, when the pilot air operates, the pilot-operated check valve 23 allows a forward flow of control air flowing through the pilot control line 7 from the air source 2 toward the air operation valve 20 and a reverse flow of control air flowing from the air operation valve 20 toward the air source 2. When the pilot air does not operate, the pilot-operated check valve 23 simply allows the forward flow of the control air, and blocks the reverse flow.

The manual relief valve 24 is a 3-port valve switchable between two positions by an operation lever 27 and a return spring 28. As illustrated in FIG. 1, when the manual relief valve 24 is switched to a first position 24a by the return spring 28, the manual relief valve 24 holds the pilot control line 7 in a conduction state to allow the control air to flow. When the manual relief valve 24 is switched to a second position 24b in FIG. 5 by the operation lever 27, the manual relief valve 24 holds the pilot control line 7 in an open state to exhaust the control air to the outside. When the operation lever 27 is released, the manual relief valve 24 is returned to the first position 24a by the return spring 28.

After storing the control air supplied from the air source 2 therein, the air tank 25 supplies the control air to the air operation valve 20 therefrom to stabilize supply of the control air.

Subsequently, the operation of the entirety of the air control circuit 1A is described.

FIG. 1 illustrates a state where the first electromagnetic valve 5a and the second electromagnetic valve 5b are both turned off and located in the first position 12, and the main air line 4 shuts the air source 2 and the air cylinder 3 from each other.

At this time, air in the pressure chamber 3c in the air cylinder 3 is exhausted to the outside from the output line 4d through the second electromagnetic valve 5b, and thus the air cylinder 3 is in the initial position where the rod 3b is retracted. The control air from the air source 2 is not supplied to the pilot control line 7, and thus the air operation valve 20 is located in the first position 20a to hold the pilot air line 6 in the supply state. Thus, the pilot air from the air source 2 is supplied to the first electromagnetic valve and the second electromagnetic valve 5b through the pilot air line 6. In addition, the pilot-operated check valve 23 allows the pilot control line 7 to conduct in both directions with the operation of the pilot air.

From this state, as illustrated in FIG. 2, when the first electromagnetic valve 5a and the second electromagnetic valve 5b are concurrently turned on to be switched to the second position 13, the air source 2 and the pressure chamber 3c in the air cylinder 3 are connected to each other through the input line 4a, the first electromagnetic valve 5a, the first relay line 4b, the second electromagnetic valve 5b, and the output line 4d. Thus, air is supplied from the air source 2 to the pressure chamber 3c, and the rod 3b in the air cylinder 3 is thus moved forward toward the operation position.

At this time, the pilot control line 7 is shut from the air source 2.

When an operation process performed by the air cylinder 3 is finished, the first electromagnetic valve 5a and the second electromagnetic valve 5b are concurrently turned off, and the air control circuit 1A is returned to the operation state illustrated in FIG. 1. Thus, the air cylinder 3 is also returned to the initial position.

However, when one of the two electromagnetic valves 5a and 5b suffers a breakdown and fails to return to the first position 12, as described below, air in the air cylinder 3 is exhausted through the returned electromagnetic valve 5a or Thus, the air cylinder 3 is returned to the initial position, and concurrently, pilot air in the first electromagnetic valve 5a and the second electromagnetic valve 5b is automatically exhausted, so that the first electromagnetic valve 5a and the second electromagnetic valve 5b are prevented from being restarted.

First, as illustrated in FIG. 3, when the second electromagnetic valve 5b is turned off to be switched to the first position 12, and the first electromagnetic valve 5a suffers a breakdown to be left in the second position 13, the output line 4d connected to the air cylinder 3 becomes open to the outside through the second electromagnetic valve 5b. Thus, air in the air cylinder 3 is exhausted through the second electromagnetic valve 5b, and the air cylinder 3 is returned to the initial position.

At this time, the pilot control line 7 is connected to the air source 2 through the first electromagnetic valve 5a and the second electromagnetic valve and thus control air is supplied from the air source 2 to the pilot control line 7. The control air is stored in the air tank 25 through the pilot-operated check valve 23 and the manual relief valve 24, and then supplied from the air tank 25 to the air operation valve 20 to switch the air operation valve 20 to the second position 20b. Then, the primary side line 6a and the secondary side line 6b in the pilot air line 6 are shut from each other, and the secondary side line 6b becomes open to the outside to become an exhaust state. Thus, pilot air in the first electromagnetic valve 5a and the second electromagnetic valve 5b are exhausted, and thus the first electromagnetic valve 5a and the second electromagnetic valve 5b are disabled from restarting.

When the pilot air in the secondary side line 6b is exhausted, the pilot air no longer operates on the pilot-operated check valve 23. Thus, the pilot-operated check valve 23 exerts its original non-return function to prevent the control air from reversely flowing through the pilot control line 7 from the air operation valve 20 toward the air source 2.

When the control air is supplied to the pilot control line 7, the pilot lamp 26 is lighted to notify an operator that any of the electromagnetic valves 5a and suffers a breakdown.

In contrast, as illustrated in FIG. 4, when the first electromagnetic valve is turned off to be switched to the first position 12, and the second electromagnetic valve 5b suffers a breakdown to be left in the second position 13, the output line 4d connected to the air cylinder 3 becomes open to the outside from the second electromagnetic valve 5b through the first relay line 4b and the first electromagnetic valve 5a, and air in the air cylinder 3 is exhausted, so that the air cylinder 3 is returned to the initial position.

Also in this case, the pilot control line 7 is connected to the air source 2 through the second electromagnetic valve 5b and the first electromagnetic valve and the control air is supplied to the pilot control line 7. Thus, as in the case in FIG. 3, the air operation valve 20 exhausts the pilot air in the first electromagnetic valve 5a and the second electromagnetic valve 5b to prevent the first electromagnetic valve 5a and the second electromagnetic valve 5b from restarting. The pilot-operated check valve 23 and the pilot lamp 26 also operate in the same manner as in the case described above.

Such an operation of the air control circuit 1A prevents a risk such as a restart of the electromagnetic valve 5a or 5b during inspection of the breakdown or a sudden start of the air cylinder 3.

Figure 5:
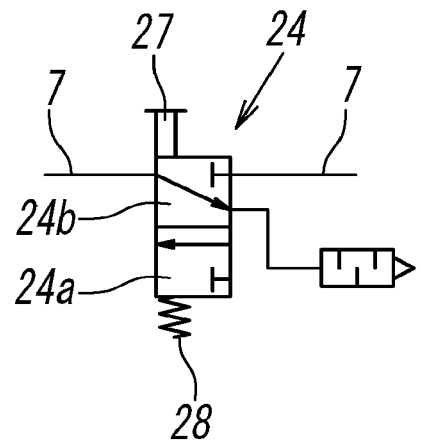
FIG. 5 is a diagram of a manual relief valve when operated.

From the states in FIG. 3 and FIG. 4, to make the air control circuit 1A into a restartable state after the electromagnetic valve 5a or 5b recovers from the breakdown, as illustrated in FIG. 5, the operation lever 27 in the manual relief valve 24 is manually operated to switch the manual relief valve 24 to the second position 24b. Thus, the pilot control line 7 is in the open state and the control air in the air tank 25 is exhausted to the outside. Thus, the air operation valve 20 is switched to the first position 20a by the return spring 22 to make the pilot air line 6 to the supply state. Thus, the pilot air from the air source 2 is supplied to the first electromagnetic valve 5a and the second electromagnetic valve 5b, and the first electromagnetic valve 5a and the second electromagnetic valve 5b become the restartable state. In addition, the pilot-operated check valve 23 allows the pilot control line 7 to conduct in both of the forward direction and the reverse direction with the operation of the pilot air.

When the operation on the operation lever 27 is released, the manual relief valve 24 is returned to the first position 24a by the return spring 28.

In the embodiment, the air tank 25 is connected to the pilot control line 7, but this air tank 25 is not necessarily provided.

Figure 6:
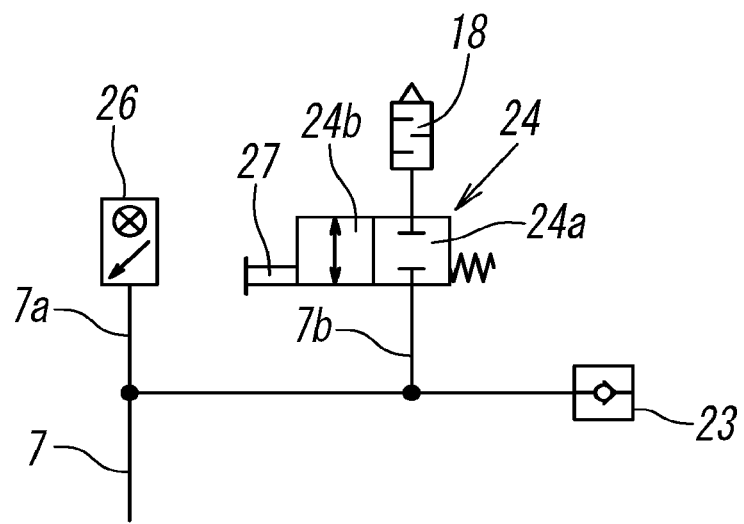
FIG. 6 is a connection diagram of a different example of a manual relief valve.

In addition, although the manual relief valve 24 is a 3-port valve, a 2-port valve may be used instead. FIG. 6 illustrates an example of connection when the manual relief valve 24 formed from a 2-port valve is used. In this example, the manual relief valve 24 is connected to a relief line 7b that diverges from the pilot control line 7.

The manual relief valve 24 is normally positioned at the first position 24a and shuts the relief line 7b. However, when the operation lever 27 is operated, the manual relief valve 24 is switched to the second position 24b to release the relief line 7b to the outside through a silencer 18. Thus, the control air in the pilot control line 7 is exhausted to the outside.

Figure 7:
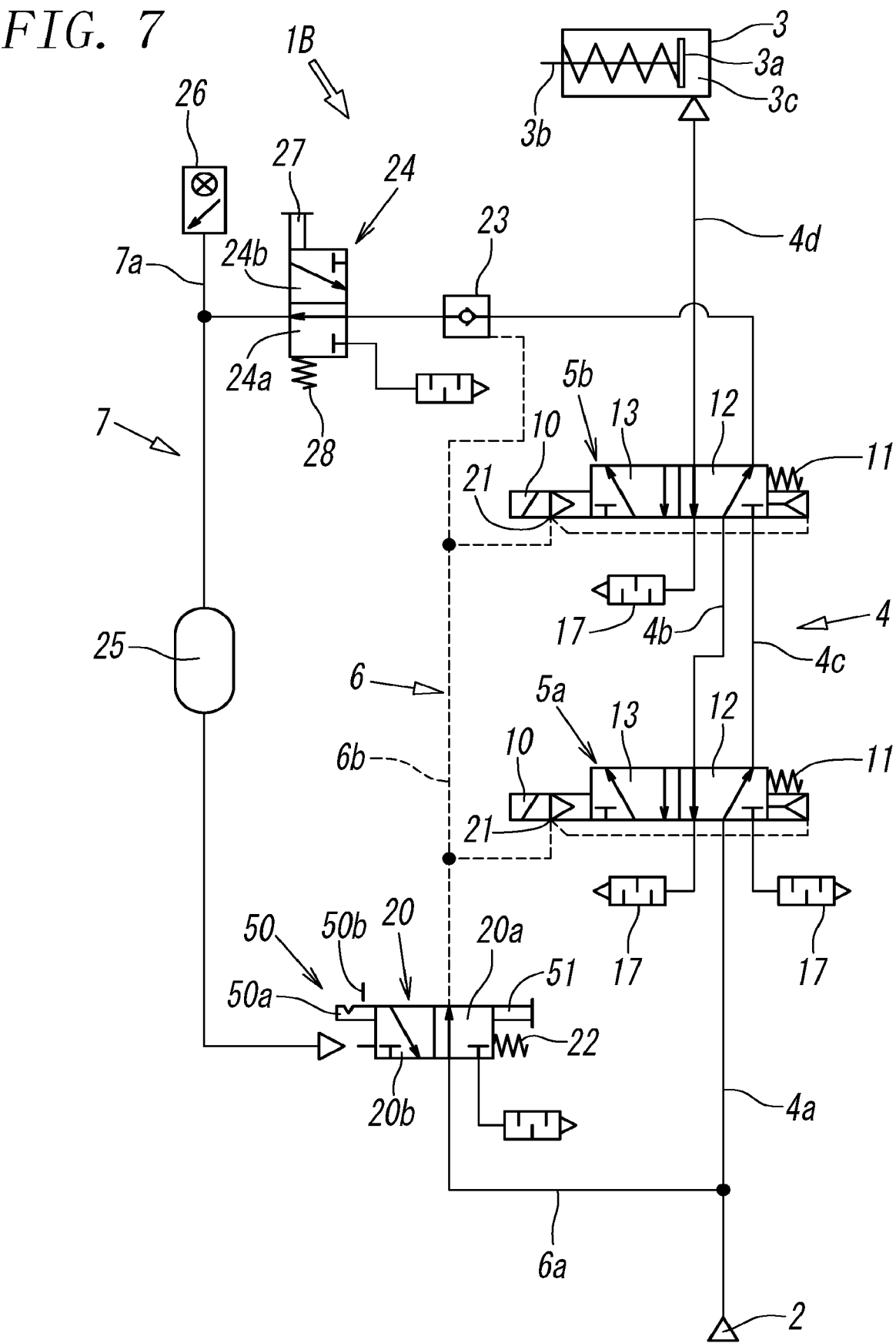
FIG. 7 is a circuit diagram of an air control circuit according to a second embodiment of the present invention.

FIG. 7 illustrates an air control circuit according to a second embodiment of the present invention. An air control circuit 1B according to the second embodiment differs from the air control circuit 1A according to the first embodiment in that an air operation valve 20 connected to the pilot air line 6 includes a detent mechanism 50 that holds the air operation valve 20 in the second position 20b, and a release button 51 that releases holding of the detent mechanism 50.

The detent mechanism 50 includes a variable member 50a that changes its position integrally with the air operation valve 20, and a locking member in which the variable member 50a can be locked. When the air operation valve 20 is switched to the second position 20b by the control air from the pilot control line 7, the variable member 50a is locked in the locking member 50b, and thus the air operation valve 20 is held in the second position 20b.

When the release button 51 is pushed, the release button 51 releases the locking of the locking member 50b in the variable member 50a, and makes the air operation valve 20 displaceable toward the first position 20a with an urging force of the return spring 22.

The reason why the detent mechanism 50 is provided is to prevent, in the case where, under the state where one of the electromagnetic valves 5a and 5b suffers a breakdown and fails to be normally switched, the air operation valve is switched to the second position 20b with the operation of the control air supplied from the pilot control line 7, and then the control air fails to operate on the air operation valve 20 because of, for example, insufficient air held in the tank 25, the electromagnetic valves 5a or 5b from becoming a restartable state by returning the air operation valve 20 to the first position 20a with the return spring 22, and changing the pilot air line 6 to a supply state to supply pilot air to the electromagnetic valve 5a or 5b.

The components and the operation of the air control circuit 1B other than the air operation valve 20 are the same as the components and the operation of the air control circuit 1A according to the first embodiment. Thus, the same main components in both embodiments are denoted with the same reference signs without being described.

The release button 51 may be configured to operate while being linked with a push-down operation of the operation lever 27 in the manual relief valve 24.

In such a case, when, from the state in FIG. 7, the operation lever 27 in the manual relief valve 24 is pushed to switch the manual relief valve 24 to the second position 24b, the release button 51 is operated while being linked with the operation, and the air operation valve 20 is switched to the first position 20a. Thus, the pilot control line 7 becomes the open state to exhaust the control air to the outside, and the pilot air line 6 becomes the supply state to supply the pilot air to the electromagnetic valve 5a or 5b.

When the pressure on the operation lever 27 is released, the manual relief valve 24 is returned to the first position 24a by the return spring 28, and the air operation valve 20 is held in the first position 20a by the return spring 22.

Figure 8:
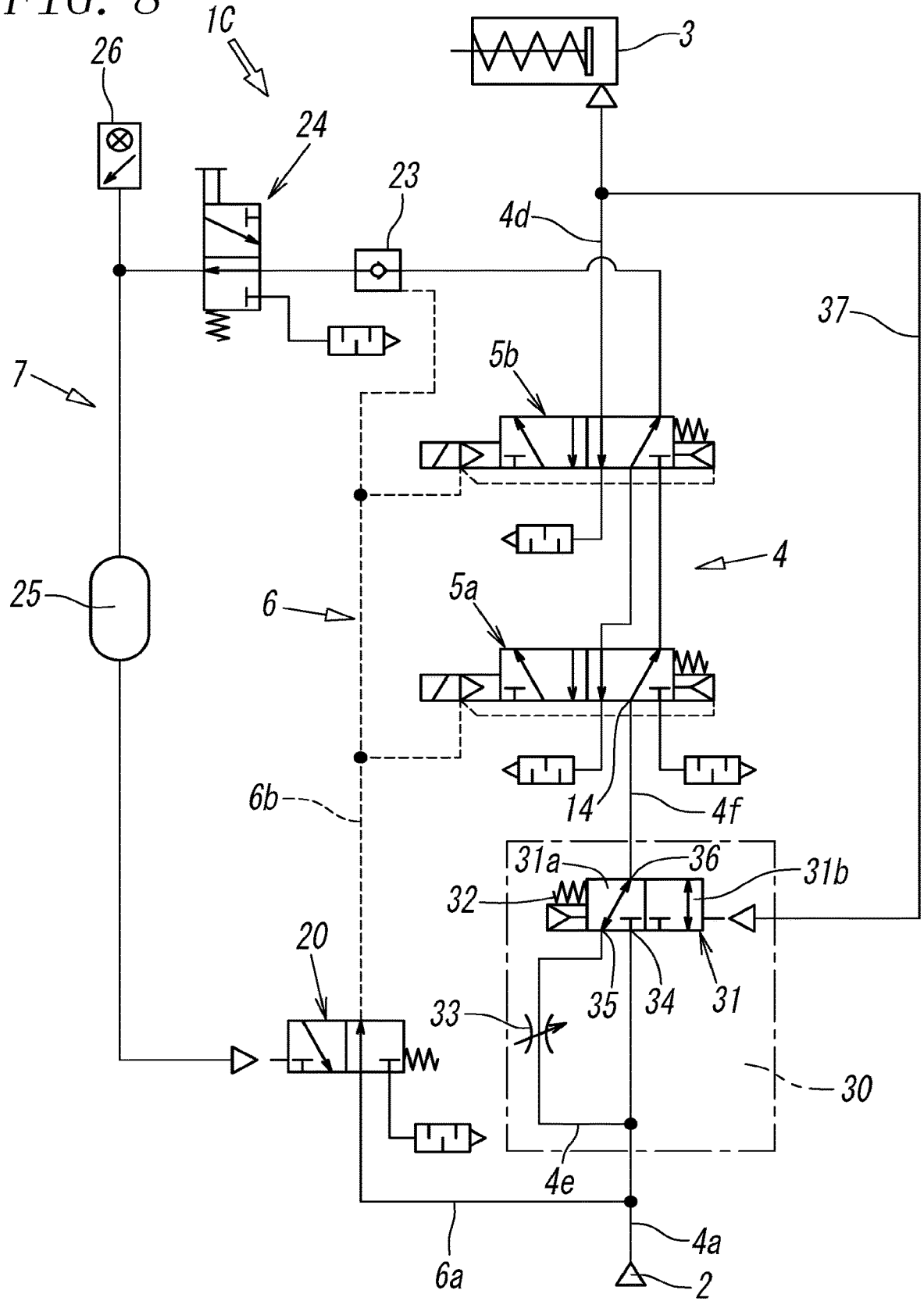
FIG. 8 is a circuit diagram of an air control circuit according to a third embodiment of the present invention.

FIG. 8 illustrates an air control circuit according to a third embodiment of the present invention. An air control circuit 1C according to this third embodiment differs from the air control circuit 1A according to the first embodiment in that a delay mechanism 30 to delay the start of the air cylinder 3 is connected to the main air line 4.

The delay mechanism 30 includes a switch valve 31 that is switchable between two positions with air and a return spring 32, and a throttle valve 33 that restricts the flow rate of air, and that is connected between the air source 2 and the first electromagnetic valve 5a.

The switch valve 31 is a 3-port valve, and includes a first port 34 connected to the input line 4a in the main air line 4, a second port 35 connected to a divergence line 4e that diverges from the input line 4a, and a third port 36 connected to the input port 14 in the first electromagnetic valve 5a with a third relay line 4f. The switch valve 31 is switched between a first position 31a in FIG. 8 and a second position 31b in FIG. 9 by the return spring 32 and feedback air that is fed back from the output line 4d connecting the second electromagnetic valve 5b and the air cylinder 3 through a feedback line 37.

The throttle valve 33 is a variable throttle valve that can adjust the cross section of the flow path.

In the air control circuit 1C, when the switch valve 31 is in the first position 31a as illustrated in FIG. 8, the first electromagnetic valve 5a and the second electromagnetic valve 5b are both turned on to be switched to the second position 13 (refer to the main air line 4 in FIG. 2), and the air source 2 and the air cylinder 3 are connected through the throttle valve 33, air from the air source 2 is supplied to the air cylinder 3 while having its flow rate restricted through the throttle valve 33. Thus, the air cylinder 3 starts slowly.

Figure 9:
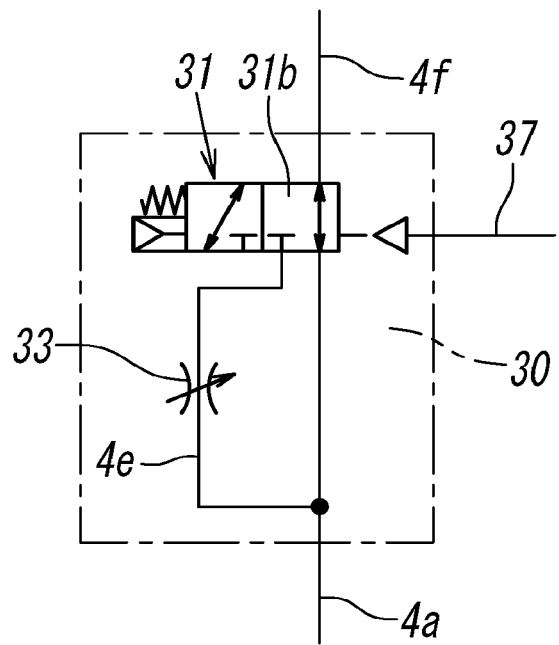
FIG. 9 is a diagram of a different operation state of a delay mechanism in FIG. 8.

Thereafter, when part of air is fed back to the switch valve 31 from the output line 4d through the feedback line 37, as illustrated in FIG. 9, the switch valve 31 is switched to the second position 31b to shut the divergence line 4e to which the throttle valve 33 is connected and to connect the input line 4a to the third relay line 4f. Thus, air from the air source 2 flows into the air cylinder 3 in a free flowing state, and thus, the rod 3b in the air cylinder 3 moves forward at a normal speed.

The components and the operation of the air control circuit 1C other than the delay mechanism 30 are the same as the components and the operation of the air control circuit 1A according to the first embodiment. Thus, the same main components between both embodiments are denoted with the same reference signs without being described.

Figure 10:
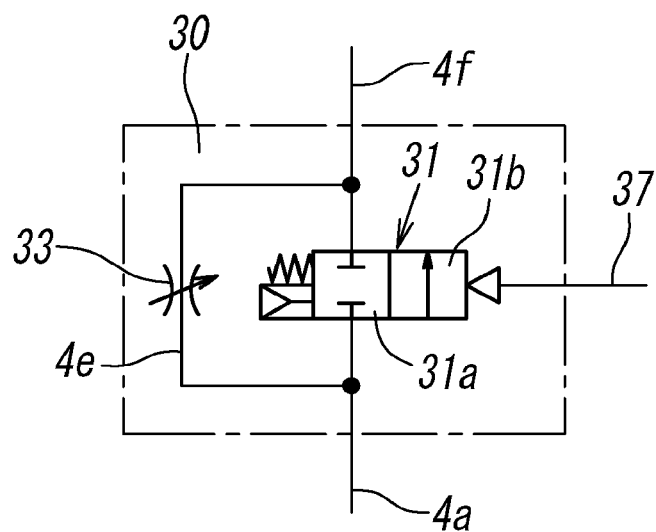
FIG. 10 is a connection diagram of a different example of a delay mechanism.
Figure 11:
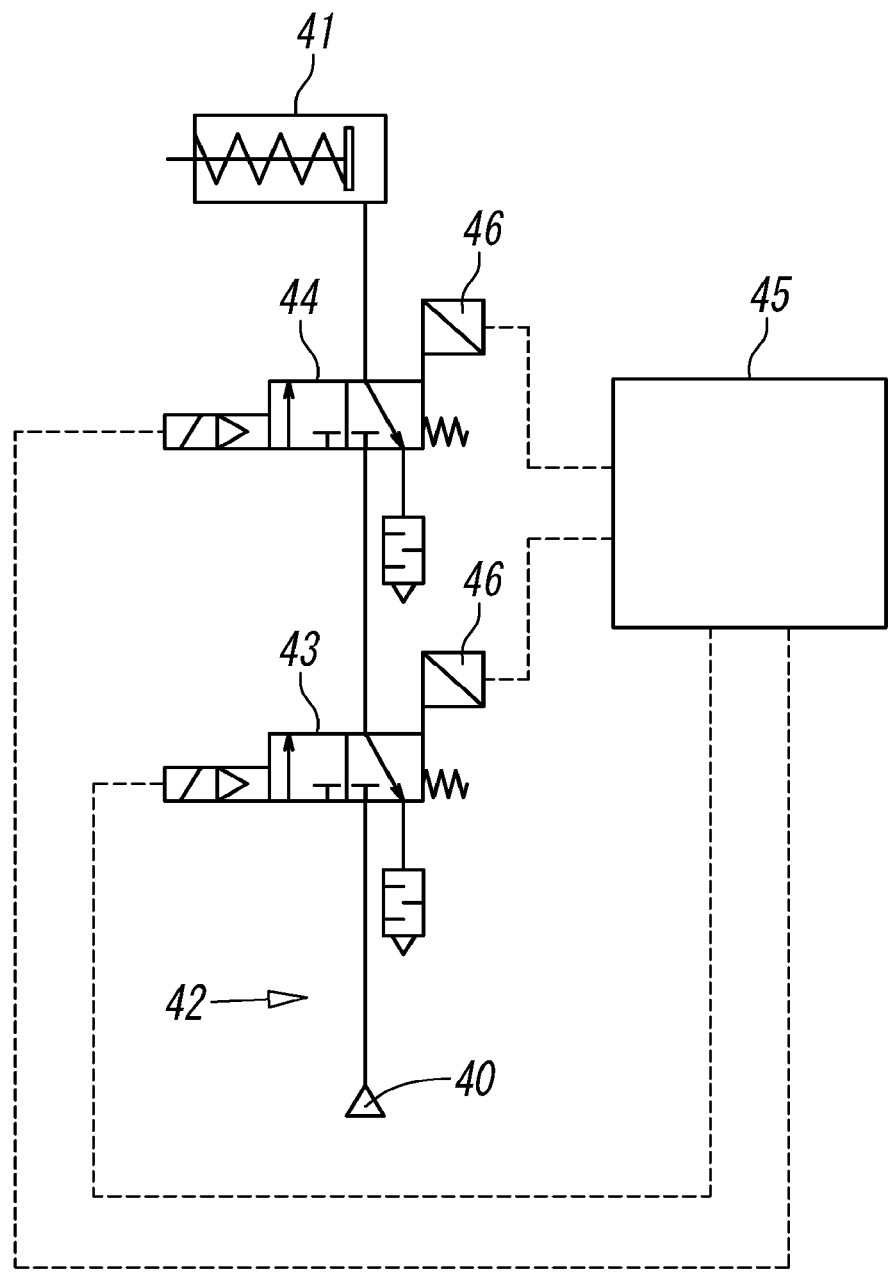
FIG. 11 is a circuit diagram of a known air control circuit.

Although the switch valve 31 in the delay mechanism 30 is a 3-port valve, a 2-port valve may be used instead. In this case, as illustrated in FIG. 10, the switch valve 31 and the throttle valve 33 are connected in parallel between the input line 4a and the third relay line 4f. Thus, at the start of the air cylinder 3, the switch valve 31 is located in the first position 31a to shut the flow path. Air from the input line 4a thus flows in the third relay line 4f while having its flow rate restricted by the throttle valve 33. When air is fed back to the switch valve 31 through the feedback line 37, the switch valve 31 is switched to the second position 31b. Thus, air from the input line 4a flows to the third relay line 4f at a free flowing state through the switch valve 31.

Also, in the air control circuit 1C according to the third embodiment, the air operation valve 20 may include the detent mechanism 50 and the release button 51 as in the case of the air operation valve 20 in the air control circuit 1B according to the second embodiment.

Although an air cylinder is illustrated as an example of the air device 3 in the illustrated embodiments, the air device 3 may be other than an air cylinder, for example, another pilot electromagnetic valve that controls the air device such as an air cylinder. In this case, when the output line 4d in the main air line 4 is connected to the pilot line in the pilot electromagnetic valve, the air device 3 can perform control to exhaust the pilot air in the pilot electromagnetic valve and reset the air device in case of emergency.

As described above in detail, each of the air control circuits 1A, 1B, and 1C is simply formed from an air circuit. Thus, compared to an existing air control circuit including, for example, a sequencer or an electromagnetic valve including a limit switch, the air control circuit is advantageous in that it has a very simple structure, it bears a low cost of equipment, and it has no need to ensure a technical expert having thorough knowledge of a safety function and a sequencer program.

REFERENCE SIGNS LIST 1A, 1B, 1C air control circuit
2 air source
3 air device (air cylinder)
4 main air line
5a first electromagnetic valve
5b second electromagnetic valve
6 pilot air line
7 pilot control line
12 first position
13 second position
14 input port
15a first output port
15b second output port
16a first exhaust port
16b second exhaust port
20 air operation valve
23 pilot-operated check valve
24 manual relief valve
25 air tank
30 delay mechanism
31 switch valve
33 throttle valve
50 detent mechanism
50a variable member
50b locking member
51 release button

The invention claimed is:

1. An air control circuit including a safety function, comprising:
  a main air line in which two external-pilot-operated electromagnetic valves are connected in series; a pilot air line that supplies pilot air to the two electromagnetic valves; and a pilot control line that switches the pilot air line between a supply state to supply the pilot air to the two electromagnetic valves and an exhaust state to exhaust the pilot air from the two electromagnetic valves,
  wherein the two electromagnetic valves in the main air line are two-position valves that have a first position for when turned off and a second position for when turned on, and the two electromagnetic valves are connected so that, when both of the two electromagnetic valves are in the first position, the electromagnetic valves shut an air source and an air device from each other and exhaust air in the air device through one of the electromagnetic valves, when both of the two electromagnetic valves are in the second position, the electromagnetic valves connect the air source and the air device to each other to supply air from the air source to the air device, and when one of the two electromagnetic valves is in the first position and the other one of the two electromagnetic valves is in the second position, the electromagnetic valves shut the air source and the air device from each other and exhaust air in the air device through the electromagnetic valve in the first position,
  wherein, an air operation valve having a first position where the pilot air line is in the supply state and a second position where the pilot air line is in the exhaust state is connected to the pilot air line, and
  wherein the pilot control line is connected to the air source or disconnected from the air source by the two electromagnetic valves, when both of the two electromagnetic valves are in the first position and when both of the two electromagnetic valves are in the second position, the pilot control line is disconnected from the air source to hold the air operation valve in the first position where the pilot air line is in the supply state, and when one of the two electromagnetic valves is in the first position and the other one of the two electromagnetic valves is in the second position, the pilot control line is connected to the air source through the two electromagnetic valves to switch the air operation valve to the second position where the pilot air line is in the exhaust state with control air supplied from the air source.

2. The air control circuit according to claim 1, wherein the air operation valve includes a detent mechanism that holds the air operation valve in the second position, and a release button that releases holding of the detent mechanism.

3. The air control circuit according to claim 1,
  wherein a pilot-operated check valve, a manual relief valve, and the air operation valve are connected to the pilot control line,
  wherein, when pilot air from the pilot air line operates on the pilot-operated check valve, the pilot-operated check valve allows a forward flow of the control air flowing through the pilot control line from the air source toward the air operation valve and a reverse flow opposite to the forward flow, and when the pilot air does not operate on the pilot-operated check valve, the pilot-operated check valve blocks the reverse flow of the control air, and
  wherein the manual relief valve switches, with a manual operation, the pilot control line from a conduction state to allow the control air to flow to an open state to exhaust the control air to an outside.

4. The air control circuit according to claim 3,
  wherein an air tank is connected to the pilot control line, and the air tank stores control air supplied from the air source and supplies the control air to the air operation valve.

5. The air control circuit according to claim 1,
  wherein the two electromagnetic valves are 5-port valves, and each include one input port, a first output port, a second output port, a first exhaust port, and a second exhaust port,
  wherein the two electromagnetic valves include a first electromagnetic valve connected to the main air line at a portion closer to the air source, and a second electromagnetic valve connected to the main air line at a portion closer to the air device,
  wherein the input port in the first electromagnetic valve is connected to the air source, the first output port in the first electromagnetic valve is connected to the input port in the second electromagnetic valve, the second output port in the first electromagnetic valve is connected to the second exhaust port in the second electromagnetic valve, the first exhaust port and the second exhaust port in the first electromagnetic valve are open to an outside, and
  wherein the first output port in the second electromagnetic valve is connected to the air device, the second output port in the second electromagnetic valve is connected to the pilot control line, and the first exhaust port in the second electromagnetic valve is open to the outside.

6. The air control circuit according to claim 1, wherein a delay mechanism that delays a start of the air device is connected to the main air line.

7. The air control circuit according to claim 6, wherein the delay mechanism includes a switch valve operated by air, and a throttle valve that restricts a flow rate of air, when both of the two electromagnetic valves are turned on to connect the air source and the air device to each other, air is allowed to flow to the main air line at a restricted rate through the throttle valve, and when part of air output from the main air line to the air device is fed back to the switch valve, the switch valve is switched to allow air from the air source to flow through the main air line in a free flowing state.

* * * * *